United States Patent
Morino (10) Patent No.: US 7,639,286 B2
(45) Date of Patent: Dec. 29, 2009

(54) IMAGE INPUT APPARATUS FOR STORING IMAGE DATA INTO A REMOVABLE RECORDING MEDIUM

(75) Inventor: Takashi Morino, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 553 days.

(21) Appl. No.: 11/011,569

(22) Filed: Dec. 14, 2004

(65) Prior Publication Data
US 2005/0128319 A1 Jun. 16, 2005

(30) Foreign Application Priority Data
Dec. 15, 2003 (JP) ............................. 2003-417238

(51) Int. Cl.
*H04N 5/76* (2006.01)
*H04N 5/225* (2006.01)

(52) U.S. Cl. .................. 348/231.8; 348/231.2; 348/372

(58) Field of Classification Search ............ 348/231.99, 348/231.2, 231.3, 231.7–231.9, 373–376
See application file for complete search history.

(56) References Cited

U.S. PATENT DOCUMENTS

| 5,584,029 A * | 12/1996 | Izui et al. ..................... 713/300 |
| 5,585,845 A | 12/1996 | Kawamura et al. |
| 5,805,219 A * | 9/1998 | Ejima et al. .................. 348/375 |
| 5,963,255 A * | 10/1999 | Anderson et al. ........... 348/372 |
| 5,986,700 A * | 11/1999 | Wakui ...................... 348/231.8 |
| 6,314,248 B1 * | 11/2001 | Ohmura et al. ............. 396/429 |
| 6,542,186 B2 * | 4/2003 | Uryu ........................ 348/231.7 |
| 6,833,866 B1 | 12/2004 | Suzuki |
| 7,095,437 B1 * | 8/2006 | Hatakeyama ............ 348/231.7 |
| 7,324,140 B2 | 1/2008 | Kikuchi |
| 2001/0006401 A1 * | 7/2001 | Nakagawa et al. .......... 348/233 |
| 2002/0130964 A1 * | 9/2002 | Fuchimukai ................ 348/375 |

FOREIGN PATENT DOCUMENTS

| JP | 03-161817 | 7/1991 |
| JP | 04-172582 | 6/1992 |
| JP | 04-289558 | 10/1992 |

(Continued)

OTHER PUBLICATIONS

English translation of Japanese Office Action dated Jan. 18, 2008 for Japanese Patent Application No. 2003-417238, which is the foreign counterpart of the present application—7 pages. (Japanese Language was submitted Mar. 18, 2008).

(Continued)

*Primary Examiner*—Timothy J Henn
(74) *Attorney, Agent, or Firm*—Cowan, Liebowitz & Latman, P.C.

(57) ABSTRACT

An image input apparatus includes a mounting unit adapted to mount a removable recording medium; and a lid for the mounting unit. If an opening of the lid is detected during access to the removable recording medium, the image input apparatus suspends the access to the removable recording medium after written data in the removable recording medium is consistent with file management information for the written data. If the lid is closed without removing the removable recording medium after the detection of the opening of the lid, the image input apparatus resumes the suspended access to the removable recording medium.

5 Claims, 6 Drawing Sheets

FOREIGN PATENT DOCUMENTS

| | | |
|---|---|---|
| JP | 06-275004 | 9/1994 |
| JP | 7-79403 A | 3/1995 |
| JP | 08-077749 | 3/1996 |
| JP | 09-107493 | 4/1997 |
| JP | 10-285526 | 10/1998 |
| JP | 11-088818 | 3/1999 |
| JP | 11-232403 | 8/1999 |
| JP | 11-249947 | 9/1999 |
| JP | 2000-244790 | 9/2000 |
| JP | 2000-295576 | 10/2000 |
| JP | 2001-229654 | 8/2001 |
| JP | 2001-307029 | 11/2001 |
| JP | 2003-298997 | 10/2003 |
| JP | 2003-309753 | 10/2003 |

OTHER PUBLICATIONS

English translation of Japanese Office Action dated Apr. 11, 2008 for Japanese Patent Application No. 2003-417238, which is the foreign counterpart of the present application—8 pages. (Japanese Language was submitted Apr. 29, 2008).

* cited by examiner

IMAGE INPUT APPARATUS FOR STORING IMAGE DATA INTO A REMOVABLE RECORDING MEDIUM

FIELD OF THE INVENTION

The present invention relates to an image input apparatus such as a digital still camera.

BACKGROUND OF THE INVENTION

When data is recorded on a recording medium such as a memory card, magnetic recording medium, optical recording medium, or the like, data management information including information which specifies the data to be recorded (e.g., a file name), recording start address, data size, and the like is recorded together with the data. Various methods are used to perform such data recording and management. For example, a data management method using a generally known FAT (File Allocation Table) file system will be described below.

A FAT file system comprises a boot sector area, FAT area, root directory area, data area, and the like. Data is managed in units called clusters. Parameters required to read/write data from/to a recording medium such as the number of FATs, the number of root directory entries, and the like are stored in the boot sector area. Chaining information of a plurality of clusters is stored in the FAT area when the plurality of clusters are used to record the data. The file name of the data to be recorded, the number of a cluster at which recording is started, data size, and other information are stored in the root directory area. The size of one cluster changes depending on the formatting method. A file larger than one cluster is recorded using a plurality of clusters.

For example, assume that three cluster (clusters 2, 3, and 4) are used to record a file. In this case, the next cluster number "3" is recorded in the FAT area of the cluster 2, and "4" is recorded in the FAT area of the cluster 3. A code (e.g., "FFFh" in the case of a 12-bit FAT) indicating the last cluster is recorded in the FAT area of the cluster 4. The file name and cluster start number "2" are recorded in the area of a directory entry 1 of the root directory area.

In an apparatus which performs data recording using the above-mentioned file system, the data recording is suspended when a removable recording medium is removed while data is recorded on the recording medium, when the battery for the apparatus main body is removed, or when the battery abruptly lowers. If data recording is suspended in this manner, some problem occurs in data such as the FAT information (chaining information), directory entries, or the like. More specifically, the FAT information may be unchained, and correct data read may be disabled. Alternatively, the size of actually recorded data may become inconsistent with that of a file recorded in a directory entry. Alternatively, some chaining information may be recorded in the FAT of a cluster not in use, and the cluster may become unavailable.

For example, assume that in an apparatus using the FAT file system, data recording is suspended. In this case, neither the number of the next cluster nor the last code is recorded in the FAT area of a cluster in which data has been recorded. In addition, the size of a file in a directory entry is different from the size of actually recorded data. When some problem occurs in data such as directory entries, FAT information which is chaining information recorded on a recording medium, and the like, recorded data associated with the problem cannot be obtained correctly even by accessing and extracting the data later.

To cope with such problem, there is available a method of performing write to a data area (i.e., actual data write) after write to an area (file management area) in which data management information such as a FAT and the like is recorded is complete. When data write to a data area is suspended, a given cluster to be used next to a write-accessed cluster is assumed to be used by the management information although the given cluster is not in use. This makes it impossible to effectively use the capacity of a recording medium.

As another method, Japanese Patent Laid-Open No. 7-79403 (U.S. Pat. No. 5,585,845) proposes a method of recording data in a file having a temporary name at the start of recording, and changing the name to the original name upon completion of recording. This method eliminates an area in which invalid data is recorded. However, write to a management area such as a FAT area or the like is not prevented. Additionally, if the recording medium is used in another device, the other device cannot understand that the file has a temporary file name, and thus the area cannot be used. The method is not different from a conventional method.

SUMMARY OF THE INVENTION

An object of the present invention is to overcome the above-described drawbacks.

Another object of the present invention is to avoid a drawback that data written into a recording medium may not consistent with its data management information, e.g., FAT information, directory entries, etc.

According to the present invention, the foregoing object is attained by providing an image input apparatus for writing image data into a removable recording medium, comprising:

a mounting unit adapted to mount the removable recording medium; and a lid for the mounting unit, wherein if an opening of the lid is detected during a write access to the removable recording medium, the image input apparatus suspends the write access after written data is consistent with file management information for the written data.

According to another aspect of the present invention, the foregoing object is attained by providing an image input apparatus for writing image data into a first and/or second removable recording medium, comprising:

a first mounting unit adapted to mount the first removable recording medium;

a second mounting unit adapted to mount the second removable recording medium; and a lid for the first and second mounting units, wherein if an opening of the lid is detected during accessing of the removable recording medium to write the image data into the first removable recording medium, the image input apparatus suspends the access to the first removable recording medium after data written into the first removable recording medium is consistent with file management information for the written data.

According to still another aspect of the present invention, the foregoing object is attained by providing an image input apparatus for writing image data into a first and/or second removable recording medium, comprising:

a first mounting unit adapted to mount the first removable recording medium;

a second mounting unit adapted to mount the second removable recording medium;

a first lid for the first mounting unit; and a second lid for the second mounting unit, wherein if an opening of the first lid is detected during accessing of the removable recording medium to write the image data into the first removable recording medium, the image input apparatus suspends the access to the first removable recording medium after data written into the first removable recording medium is consistent with file management information for the written data.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
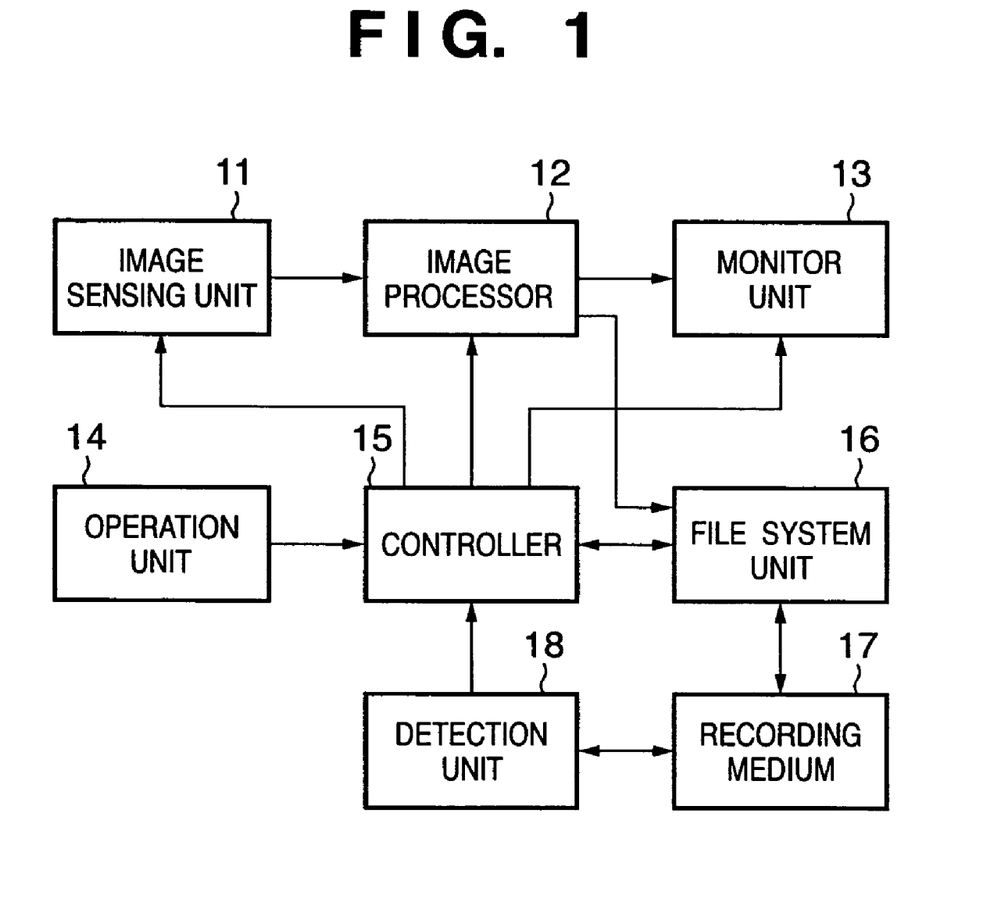
FIG. 1 is a block diagram showing an arrangement example of a digital camera as an example of an image input apparatus according to an embodiment of the present invention.

FIG. 1 is a block diagram showing an arrangement example of a digital camera as an example of an image input apparatus according to an embodiment of the present invention.

An image sensing unit 11 has an image sensing element such as a CCD sensor or CMOS sensor and optical components including a lens and AF mechanism. When a photographing instruction is input from an operation unit 14 comprising various buttons and the like such as a release switch, zoom button, buttons for various settings, and touch panel by, e.g., pressing the release switch, a controller 15 which controls the entire camera detects the instruction. The controller 15 generates a control signal in response to the photographing instruction and instructs the image sensing unit 11 to perform image sensing. The image sensing unit 11 performs image sensing in accordance with predetermined exposure parameters and outputs one image data obtained to an image processor 12.

The image processor 12 performs predetermined various image processes (development). After that, the image processor 12 compression-codes the image data on the basis of predetermined encoding parameters (encoding format, compression ratio, and the like) and outputs the resultant data to a file system unit 16. In this example, the image processor 12 performs JPEG-based compression coding. The file system unit 16 has a hardware interface for mounting a removable recording medium 17 and controls read/write of data on the mounted recording medium 17.

Upon reception of image data from the image processor 12, the file system unit 16 determines a new file name from the arrangement of folders and files in the mounted recording medium 17, gives the determined file name to the image data, and stores the image data in the recording medium 17.

A detection unit 18 detects whether the recording medium 17 can be inserted/removed (e.g., the open/closed state of a lid provided for a slot to mount the recording medium 17) and insertion/removal of the recording medium 17 into/from the slot and notifies a controller 15 of the information. The controller 15 performs power supply control and controls access to the recording medium in accordance with information from the detection unit 18 or information set in the camera. In FIG. 1, the detection unit 18 is arranged separately from the file system unit 16. However, the detection unit 18 may constitute a part of the file system unit 16.

(Access Control Operation)

Figure 2:
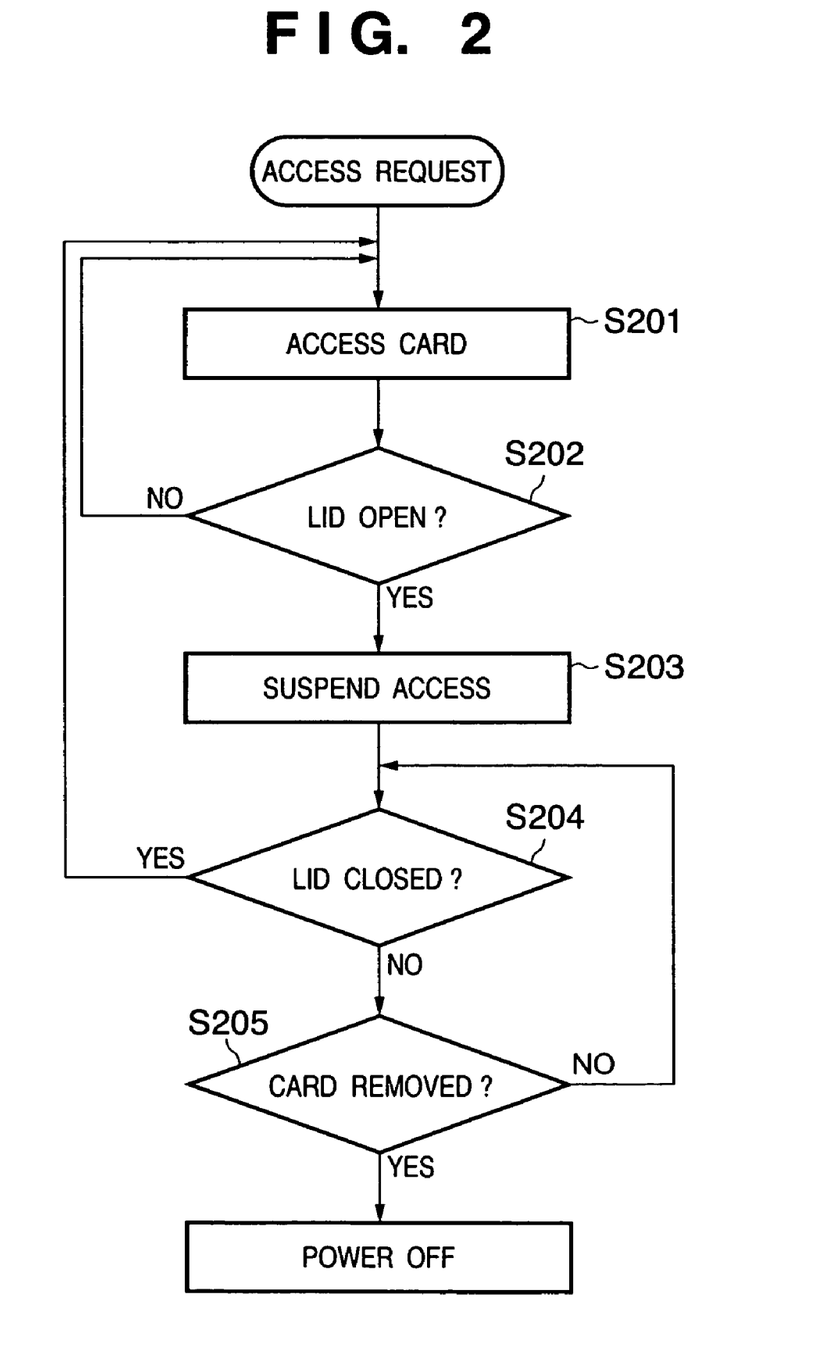
FIG. 2 is a flowchart for explaining an access control process according to the first embodiment.

FIG. 2 is a flowchart for explaining the access control operation of the digital camera according to the first embodiment. In this embodiment, a state wherein the recording medium can be inserted/removed is detected by detecting the open/closed state of the lid for the recording medium.

Step S201: For example, when a request for access to the recording medium 17 (write request) such as recording of photographed image data is issued in an image playback process, photographing process by pressing the release button of the operation unit 14, or the like, the controller 15 starts accessing the recording medium 17 using the file system unit 16.

Step S202: The detection unit 18 monitors the open/closed state of the lid of the slot for mounting the recording medium 17. When the lid is kept closed, the file system unit 16 continues to access the recording medium 17.

Step S203: When the detection unit 18 detects in step S202 that the lid of the slot for mounting the recording medium 17 is opened, the controller 15 instructs the file system unit 16 to suspend accessing the recording medium 17. The open state of the lid is made known by displaying a message, icon, or the like on a monitor unit 13 or outputting voice, an alarm, or the like.

At the time of suspension, data write is assumed to have ended with data written up to that time. EOF data is written to the end of data of a cluster being written, and file management information including the data size and FAT information is written. In other words, data write is suspended such that actually written data is consistent with the file management information for the written data. Accordingly, as for at least data written before the stop, the consistency between actually written-data and the file management information is maintained. A writing suspension process is started not after the recording medium is actually removed but when a state wherein the recording medium can be removed is detected. For this reason, even if the recording medium is actually removed, the suspension process will have already ended, thereby preventing a conventional problem.

At the time of suspension, write is not ended immediately. Various methods (e.g., a method of ending write after a cluster being written has been fully written) can be adopted. Basically, write at the time of suspension may be stopped at an arbitrary timing as far as the suspension process ends within a time period necessary to actually remove the recording medium from when it is detected that the recording medium is ready to be removed (or operation of setting the recording medium in a removable state is performed).

At the time of suspension, information for correctly performing processing when the write process is resumed is stored. For example, the remaining image data and information indicating that write is suspended are temporarily saved in a memory (not shown).

Step S204: If the detection unit 18 detects that the lid of the slot for mounting the recording medium 17 is open while access to the recording medium 17 is suspended, the flow shifts to step S205. On the other hand, if it is detected that the lid is closed, the memory is referred to. When the write is suspended, the flow shifts to step S201 to resume accessing the recording medium 17.

At the time of the resumption of access, image data remaining in the memory is added to a file in which data has been written halfway.

Step S205: If the detection unit 18 detects that the recording medium 17 is removed while access to the recording medium 17 is suspended, the controller 15 instructs a power controller (not shown) to power off the camera. At this time, before power-off, the monitor unit 13 may be notified of a message or the like representing that image data photographed (or copied or moved from another recording medium) last is written only halfway.

According to this embodiment, when it is detected during write to a recording medium that the recording medium is ready to be removed, the data write is normally ended. Even if the recording medium is removed after that, the contents of file management information and those of actually written data are kept consistent with each other.

If the recording medium is not removed, and the removable state of the recording medium becomes undetected, write is resumed. This makes it possible to certainly record data to be written to the last.

Second Embodiment

Figure 3:
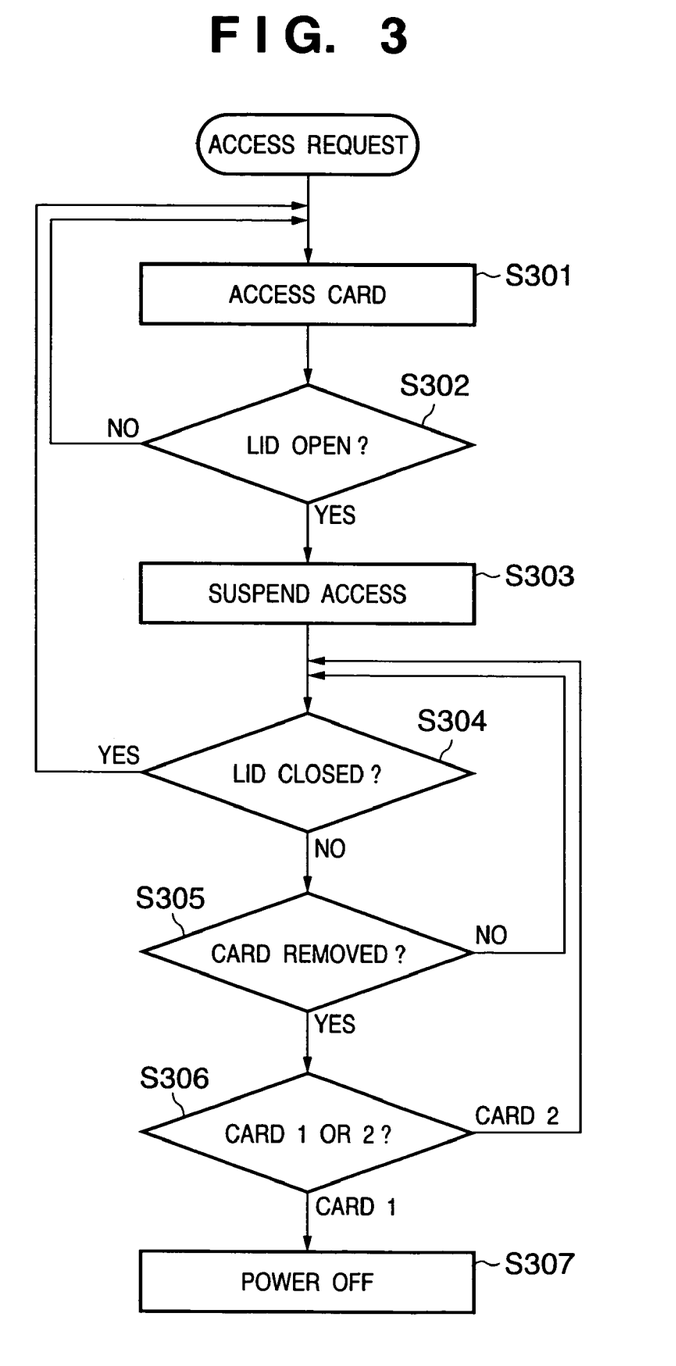
FIG. 3 is a flowchart for explaining an access control process according to the second embodiment.

The access control operation of a digital camera according to the second embodiment of the present invention will be described with reference to the flowchart shown in FIG. 3. The digital camera according to this embodiment can use a plurality of recording media (to be simply referred to as cards hereinafter) as recording media 17.

For the sake of descriptive simplicity, a case will be described wherein two recording media (the first card and second card) can be used, and the first card is accessed. Similarly to the first embodiment, the removable state of each recording medium is detected by detecting the open/closed state of a lid which covers a slot in which the recording medium is mounted. In this example, a lid which covers a slot (the first slot) in which the first card is mounted and one which covers a slot (the second slot) in which the second card is mounted are one and the same.

Step S301: For example, when a request for access to the recording medium 17 (write request) such as recording of photographed image data is issued in an image reproduction process, photographing process by pressing a release button of an operation unit 14, or the like, a controller 15 starts accessing the first card using a file system unit 16.

Step S302: A detection unit 18 monitors the open/closed state of the lid of the slot for mounting the recording medium 17. When the lid is closed, the file system unit 16 continues to access the first card.

Step S303: When the detection unit 18 detects in step S302 that the lid of the slot for mounting the recording medium 17 is opened, the controller 15 instructs the file system unit 16 to suspend accessing the first card. The open state of the lid is made known by displaying a message, icon, or the like on a monitor unit 13 or outputting voice, an alarm, or the like.

A process to be performed at the time of suspension may be the same as that described in the first embodiment.

Step S304: If the detection unit 18 detects that the lid of the slot for mounting the recording medium 17 is open while access to the first card is suspended, the flow shifts to step S305. On the other hand, if it is detected that the lid is closed, the memory is referred to. When the write is suspended, the flow shifts to step S301 to resume accessing the first card.

At the time of the resumption of access, image data remaining in the memory is added to a file in which data has been written halfway.

Step S305: It is checked whether the detection unit 18 detects that the first or second card is removed. If the detection unit 18 detects no removal, the flow returns to step S304. On the other hand, if any removal is detected, the flow shifts to step S306.

Step S306: It is checked whether the card being accessed is removed. More specifically, it is checked in this embodiment whether the detection unit 18 detects that the first card is removed. If removal of the first card is detected, the flow shifts to step S307. On the other hand, if removal of the second card is detected, the flow returns to step S304. No problem occurs even if a card other than one being accessed is removed.

Step S307: The controller 15 instructs a power controller (not shown) to power off the camera. At this time, before power off, the monitor unit 13 may be notified of a message or the like representing that image data photographed (or copied or moved from another recording medium) last is written only halfway.

For the sake of descriptive simplicity, this embodiment has described a case wherein two recording media are used. The present invention can also be applied to the case of three or more recording media.

Third Embodiment

Figure 4:
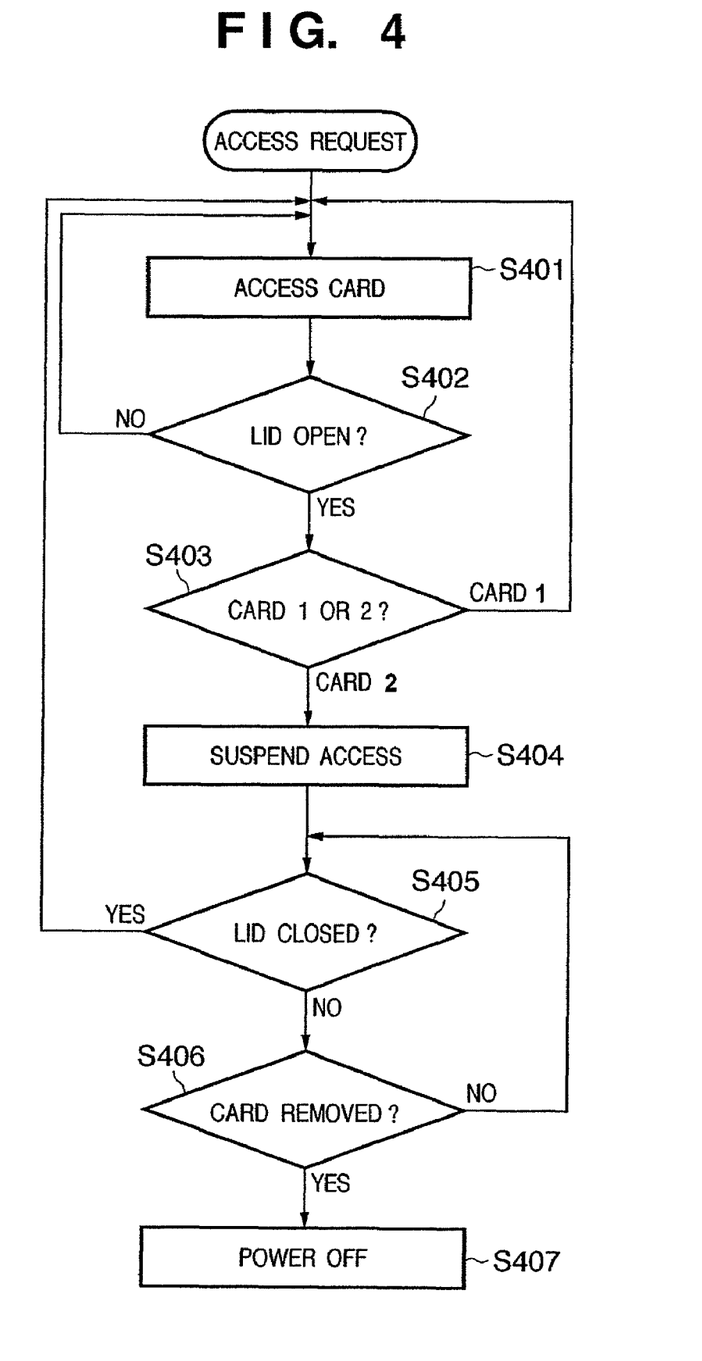
FIG. 4 is a flowchart for explaining an access control process according to the third embodiment.

The access control operation of a digital camera according to the third embodiment of the present invention will be described with reference to the flowchart shown in FIG. 4. The digital camera according to this embodiment can use a plurality of recording cards as recording media 17, similarly to the second embodiment. In the second embodiment, write to the first card is independent of write to the second card. This embodiment is different from the second embodiment in that the second card is used as a backup for the first card. More specifically, simultaneously with write to the first card, backup data is written to the second card. A case will be described wherein the priority of the second card serving as the backup is set higher than that of the first card, and protection of the second card is placed at the highest priority. Such setting is implemented by the user using, e.g., a GUI. The setting is stored in a nonvolatile memory (not shown) together with other settings.

In this embodiment, for the sake of descriptive simplicity, the removable state of each recording medium is detected by detecting the open/closed state of a lid which covers a slot in which the recording medium is mounted, similarly to the first and second embodiments. In this embodiment, a lid which covers a slot (the first slot) in which the first card is mounted and one which covers a slot (the second slot) in which the second card is mounted are separately provided.

Step S401: For example, when a request for access to the recording media 17 (write request) such as recording of photographed image data is issued in an image reproduction process, photographing process by pressing a release button of an operation unit 14, or the like, a controller 15 starts accessing the first and second cards using a file system unit 16.

Step S402: A detection unit 18 monitors the open/closed states of the lids of the first and second slots. When the lids are kept closed, the file system unit 16 continues to access the first and second cards. If it is detected that either lid is open, the flow shifts to step S403.

Step S403: If the lid of the first slot corresponding to the first card having lower priority is detected to be open, no operation is performed, and the flow shifts to step S401 to continue access. On the other hand, if the lid of the second slot corresponding to the second card having higher priority is detected to be open, the flow shifts to step S404.

Step S404: The controller 15 instructs the file system unit 16 to suspend accessing the second card. The open state of the lid of the second slot is made known by displaying a message, icon, or the like on a monitor unit 13 or outputting voice, an alarm, or the like. The access suspension process for the second card may be the same as that described in the first embodiment.

Step S405: If the detection unit 18 detects that the lid of the second slot is open while accessing the second card is suspended, the flow shifts to step S406. On the other hand, if it is detected that the lid is closed, the memory is referred to. When the write is suspended, the flow shifts to step S401 to resume accessing the second card.

At the time of the resumption of accessing, image data remaining in the memory is added to a file in which data has been written halfway.

Step S406: It is checked whether the detection unit 18 detects that the second card is removed while access to the second card is suspended. If the detection unit 18 does not detect that the second card is removed, the flow returns to step S405. On the other hand, if the detection unit 18 detects that the second card is removed, the flow shifts to step S407.

Step S407: The controller 15 instructs a power controller (not shown) to power off the camera. At this time, before power-off, the monitor unit 13 may be notified of a message or the like representing that as for image data photographed (or copied or moved from another recording medium) last, at least recording of a backup has not normally ended.

As described above, the access suspension process is not performed for the first card having lower priority even if the lid of the first slot is opened. For this reason, write to the first card has probably ended at the time of power-off in step S407 unless the first card is removed halfway during the write. However, it is preferable to confirm the written state of the first card before power-off, wait for the end of write if the write is in progress, and perform power-off.

As described above, according to this embodiment, if a plurality of recording media can be used, different access control processes can be performed depending on the priority. Significance-based data protection can be performed.

If backup recording is to be performed by an arrangement in which a plurality of slots share a lid, like the digital camera according to the second embodiment, the process for the second card (having higher priority) may be performed for all cards, regardless of the priorities set for the respective cards. A recording medium serving as a backup can be set to any one, and the priority setting can arbitrarily be performed.

Fourth Embodiment

The above-mentioned embodiments have been described while paying attention to removal of a recording medium being written. As described above, inconsistency between data and file management information may be caused even by a reduction in power supply voltage.

This embodiment eliminates inconsistency between data and file management information caused by a reduction in power supply voltage during data write.

Figure 5:
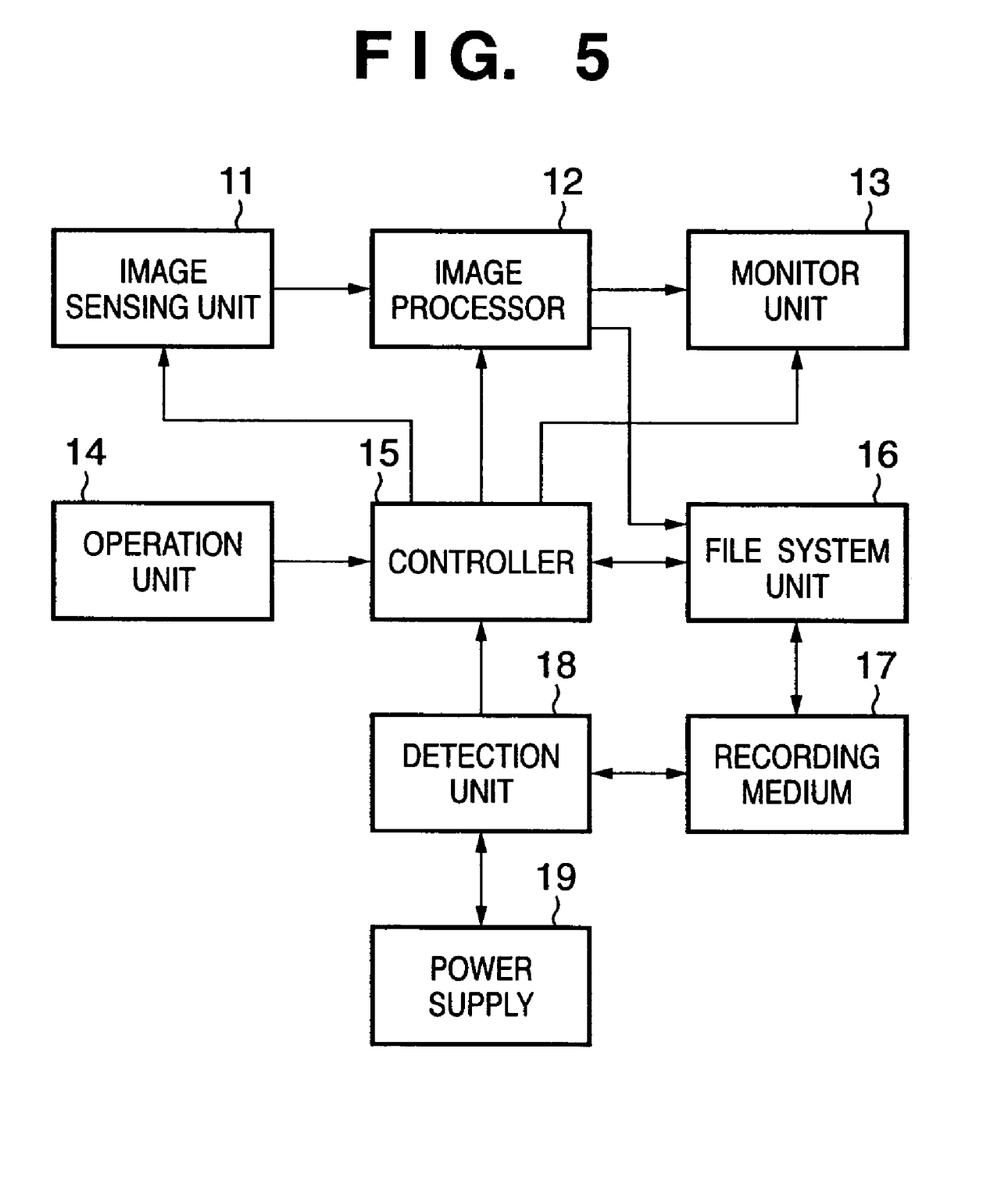
FIG. 5 is a block diagram showing an arrangement example of a digital camera as an example of an image input apparatus according to the fourth embodiment of the present invention.

FIG. 5 is a block diagram showing an arrangement example of a digital camera as an example of an image input apparatus according to this embodiment. The same reference numerals in FIG. 5 denote the same parts as those in FIG. 1. The digital camera according to this embodiment is the same as that according to the first embodiment except that a detection unit 18 monitors the voltage of a power supply 19 such as a primary cell, secondary cell, or the like and notifies a controller 15 if the voltage becomes lower than a predetermined voltage. A repetitive description will be omitted.

Figure 6:
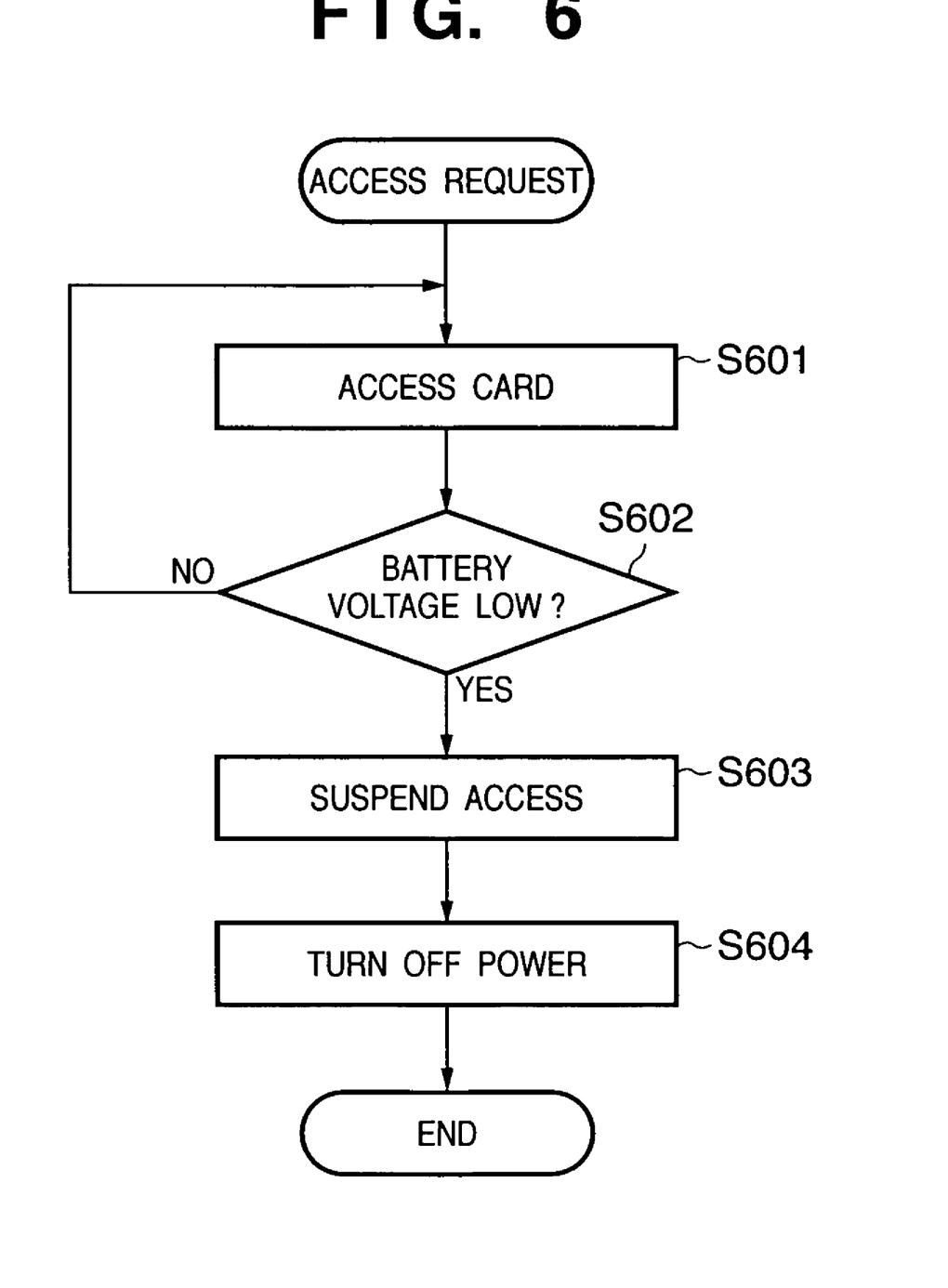
FIG. 6 is a flowchart for explaining an access control process according to the fourth embodiment.

The access control operation of this embodiment will be described with reference to the flowchart shown in FIG. 6.

Step S601: For example, when a request for access to a recording medium 17 (write request) such as recording of photographed image data is issued in an image reproduction process, photographing process by pressing a release button of an operation unit 14, or the like, a controller 15 starts accessing the recording medium 17 using a file system unit 16.

Step S602: The detection unit 18 monitors the voltage of the power supply 19. If the voltage is equal to or more than the predetermined voltage, the file system unit 16 continues to access the recording medium 17. If the detection unit 18 detects that the voltage becomes lower than the predetermined voltage, the flow shifts to step S603.

Step S603: If the detection unit 18 detects in step S602 that the voltage of the power supply 19 lowers, the controller 15 instructs the file system unit 16 to suspend accessing the recording medium 17. A reduction in power supply voltage is made known by displaying a message, icon, or the like on a monitor unit 13 or outputting voice, an alarm, or the like.

A process to be performed at the time of suspension may be the same as that described in the first embodiment.

Step S604: When the suspension process ends, the camera is powered off in step S604.

As described above, according to this embodiment, if it is determined that the write process may be disabled halfway due to a reduction in power supply voltage, the data write is suspended (is made to normally end with data written up to that time). This maintains the consistency between the contents of file management information and those of actually written data.

The access control according to the fourth embodiment can be implemented in combination with that in the first to third embodiments.

Other Embodiments

The first to third embodiments have described a case wherein the removable state of each recording medium is detected by the open closed state of a lid provided for a slot to mount the recording medium. The removable state can be detected by any other method. More specifically, the effects of the present invention can be implemented by performing the access control process using any state change before the recording medium is actually removed. For example, in an apparatus in which a memory card is removed from a slot by pressing a lever, the start of lever press may be detected, and an access suspension process may be performed upon the detection.

The above-mentioned embodiments have described only a digital camera comprising a single device. Equivalent functions may be implemented by a system comprising a plurality of devices. For example, equivalent functions can be implemented by a general-purpose computer device to which a memory card reader/writer and camera are connected. Note that an image sensing unit 11 and image processor 12 are not essential to the present invention, and data prepared in advance may be written to a recording medium.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-417238 filed on Dec. 15, 2003, which is hereby incorporated by reference herein.

What is claimed is:

1. An image recording apparatus comprising:
   a first mounting unit adapted to mount a first removable recording medium;
   a second mounting unit adapted to mount a second removable recording medium; and
   a controller adapted to control recording of data into the first and the second removable recording media,
   wherein in case that image data is to be recorded into a selected one of the first and the second removable recording media and if an opening of a lid for the selected one of the first and the second removable recording media is detected during access to the selected one of the first and the second removable recording media, said controller suspends the access to the selected one of the first and the second removable recording media after file management information for the written data is recorded to the selected one of the first and the second removable recording media, and
   wherein in case that same image data is to be recorded into both the first and the second removable recording media and if an opening of a lid for a predetermined one of the first and the second removable recording media is detected during access to the first and the second removable recording media, said controller suspends the access to the predetermined one of the first and the second removable recording media after the file management information for the written data is recorded to the predetermined one of the first and the second removable recording media while continuing access to the other of the first and the second removable recording media even if a lid for the other of the first and second removable media is opened.

2. The image recording apparatus according to claim 1, wherein if the predetermined one of the first and second removable recording media to which access has been suspended is removed, the image recording apparatus is powered off.

3. The image recording apparatus according to claim 1, wherein if a voltage of a power supply becomes less than a predetermined voltage threshold during the access to the first and/or the second removable recording media starts, said controller also suspends the access to the first and/or the second removable recording media that is being accessed, after recording the file management information for the written data to the first and/or the second removable recording media.

4. The image recording apparatus according to claim 1, wherein the image recording apparatus is a digital still camera.

5. The image recording apparatus according to claim 1, wherein if the lid for the predetermined one of the first or the second removable recording medium to which access has been suspended is closed without removing the predetermined one of the first or the second removable recording medium after the detection of the opening of the lid, the controller resumes the suspended access to the predetermined one of the first or the second removable recording medium.

* * * * *